A. L. SALTZMAN.
PROCESS OF REGISTERING LETTERPRESS MATTER AND MAKING PRINTING PLATES THEREFROM.
APPLICATION FILED JAN. 20, 1905. RENEWED JUNE 11, 1914.
1,124,531. Patented Jan. 12, 1915.
*Fig. 1.*
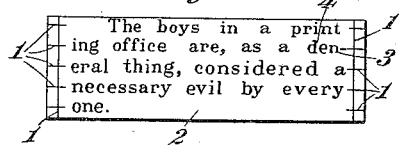
*Fig. 3.*
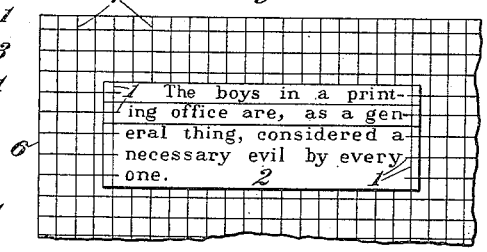
*Fig. 2.*
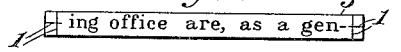
*Fig. 4.*
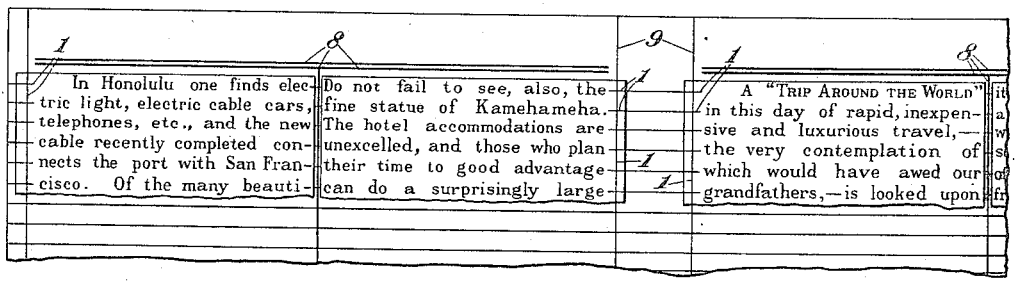
*Fig. 5.*
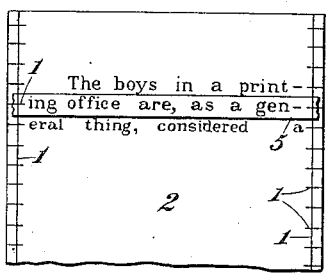
*Fig. 6.*
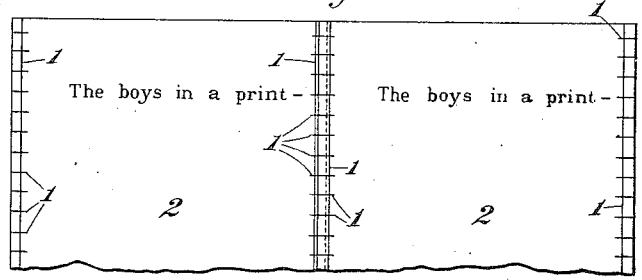
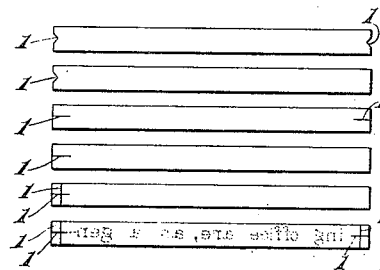
*Fig. 7.*
Witnesses:
F. L. Edwards
Clara Phillips
Inventor,
Auguste L. Saltzman
By John D. Morgan
Attorney.

UNITED STATES PATENT OFFICE.

AUGUSTE L. SALTZMAN, OF EAST ORANGE, NEW JERSEY, ASSIGNOR, BY MESNE ASSIGNMENTS, TO JAMES G. COFFIN, TRUSTEE.

PROCESS OF REGISTERING LETTERPRESS MATTER AND MAKING PRINTING-PLATES THEREFROM.

1,124,531.              Specification of Letters Patent.      Patented Jan. 12, 1915.

Application filed January 20, 1905, Serial No. 242,022. Renewed June 11, 1914. Serial No. 844,587.

*To all whom it may concern:*

Be it known that I, AUGUSTE L. SALTZMAN, a citizen of the United States, residing at East Orange, in the county of Essex and State of New Jersey, have invented a new Process of Registering Letterpress Matter and Making Printing-Plates Therefrom, of which the following is a specification.

This invention has for its object the relative positioning of designs or characters with reference to each other in a rapid, simple, accurate and efficacious manner.

An object of the invention, more particularly, is to provide a method whereby designs or characters may be positioned with reference to each other either directly, or by the employment of an auxiliary surface.

An object of the invention, more particularly, is to provide a design-bearing or character-bearing surface having also locating or registering means carried upon the surface.

An object of the invention, more particularly, is to provide a design-bearing or character-bearing surface having registering means bearing a definite relation to the design or characters, said means being capable of coaction with similar means upon a similar surface or with other means upon a surface of a different character.

A further object of the invention is to provide an auxiliary surface which may be used, when desired, to assist in carrying out the method of locating or positioning surfaces bearing designs or characters.

An object of the invention, more particularly, is to provide an auxiliary surface provided with locating or registering means which are so designed and arranged as to coöperate with other registering means which may be carried upon design-bearing or character-bearing surfaces which it is desired to locate with reference to each other.

These and other objects will more fully appear from the following description.

The invention consists in the novel methods, means, parts, improvements and combinations herein shown and described.

The accompanying drawings, referred to herein and forming a part hereof, illustrate in part a means for carrying into practice the method embraced in the invention, and also an embodiment of design-bearing or character-bearing surfaces and of an auxiliary surface, said drawings serving in connection with the description herein, to explain the principles of the invention.

Of the drawings:—Figure 1 represents one form of a design-bearing or character-bearing surface showing a form of locating or registering means. Fig. 2 shows a similar surface carrying a single series of characters with its locating means. Fig. 3 shows an auxiliary surface and a method of locating or registering two character-bearing surfaces thereon. Fig. 4 shows another form of auxiliary surface and a method of locating different units thereon and, with respect to each other. Fig. 5 shows a method of locating two design-bearing or character-bearing surfaces with respect to each other. Fig. 6 is a showing similar to Fig. 5 but with units of a different character. Fig. 7 shows different forms of locating or registering means.

It is desirable and necessary in the printing art that various design-bearing or character-bearing surfaces be brought together in a rapid, expeditious and accurate manner, as hereinbefore indicated, for various purposes, among these being the assembling or positioning of lines, whenever desired, as in making of the corrections found necessary from reading proof, etc., the assembling of "takes", articles, etc., into columns, columns into pages, pages into forms, as well as the positioning of designs, illustrations, etc., with respect to reading matter.

It has been found to be highly advantageous in the printing art to compose matter upon a machine which is adapted to produce composition for a planographic printing surface. Such machines are adapted to reproduce matter in justified lines, which lines either singly or in groups may be transferred to a stone, metal or other surface and by means well-known to the art prepared for printing planographically, or otherwise.

In Fig. 1 of the drawings is shown a series of lines of this character and at each end of the line is shown one form of locating or registering marks 1, the purpose and use of which will hereinafter appear. These marks may be of such various forms or characters as may be found desirable or convenient, some variations thereof being shown in Fig. 7 of the drawings. These marks or lines may also be placed at either end or at both ends of the line of characters or may be placed in any desired definite relation with respect to the character or design; the marks may be placed upon the reverse side of the sheet or strip from the design or character; they may consist of slits or notches in the paper; may be used singly or in groups; may be arranged in fixed relation with respect to each other, as well as to the characters or designs, and may be varied in other respects as found convenient or desirable. In some aspects of the invention it is only essential that the marks or lines bear a definite relation to the corresponding design or character, or series of characters, while in other aspects of the invention it is essential that they also bear a definite relation to one or more edges of the sheet or other character or design-bearing surface. While these marks or lines are accurately and conveniently placed upon the design or character-bearing surface by the composing machine they may be placed upon the surface by other means and may also be placed upon design or character-bearing surfaces which have been imprinted by means other than a composing machine. The form of mark shown in Fig. 1 is an exceedingly efficacious form in that it is in fixed relation to the designs or characters and also in fixed relation to the various edges of the sheet, the particular use of this relation being hereinafter more fully set forth.

An illustration of the use of the method in positioning lines of characters with respect to each other is furnished where corrections in lines of characters are found necessary upon reading of proof, as shown at 4 in the line indicated by the reference numeral 3 of Fig. 1. Such correction may be made by composing a new line such as 5 shown at Fig. 2, said line 5 having at its ends locating or registering marks 1 similarly to the lines in the strip or sheet 2 shown in Fig. 1. The defective line 3 may then be cut out of the strip or sheet shown at Fig. 1 and the matter above and below it may be positioned upon an auxiliary or assembling sheet 6, shown in Fig. 3 and which carries locating or registering marks or lines 7 having the same relations with respect to each other that the locating or registering marks or lines upon the strip or sheet 2 have with respect to each other. It will thus be seen that space may be left for the corrected line 5 and such line when it comes from the composing machine, or other source, may then be inserted in its proper place and in perfect alinement with the remaining lines of the original strip as clearly shown at Fig. 3.

Where it is not desired to make use of the auxiliary or assembling sheet 6 the new line 5 may be superposed upon the strip or sheet 2, the locating or registering marks or lines coacting with the locating or registering marks or lines upon the strip 2 to position the line with respect to the remaining lines thereon.

Where the matter upon the strip 2 is designed for contact transfer to a planographic surface for printing, such matter is printed in transfer ink and the marks 1 are also printed in transfer ink, when it may be so desired, and the locating or registering marks would then appear upon the plate or other surface to which the composed matter or design upon the surface 2 is transferred. An impression of the composed matter and of the locating or registering marks may then be taken for the use of the proof reader, and on the return of the same with all corrections indicated thereon a retransfer sheet may also be taken from said plate or surface upon which all corrections are readily and accurately made in one of the ways herein set forth, illustrated particularly in Figs. 3 and 5. The corrected retransfer sheet may then be placed in proper position upon the assembling sheet in proper relation to such other matter as it may be desired to use therewith upon the printing plate and the entire assembled matter may then be transferred to the printing plate.

In Fig. 4 another form of auxiliary or assembling sheet is shown wherein locating or registering marks of a different character are used to indicate the location of different units of composed matter such as lines, columns, and pages. 8 indicates a locating or registering line for columns while 9 indicates locating or registering lines for pages. With this form of assembling sheet the lines 8 and 9 may be in transferable ink if desired while the lines 1 are in non-transferable ink. The locating or registering marks 1 may then be cut off or removed from the corrected printed columns of the transfer sheet and such columns can then be alined by means of the lines 8 and 9 into pages and when the transfer is made to the printing plate the lines 8 and 9 will also transfer, thus serving as inter-columnar rules or lines upon the printing plate.

From the foregoing it will be obvious that the method is equally applicable to the making up of composed matter into columns and columns into pages and pages into forms; the assembling of columns into pages by use of the auxiliary or assembling sheet being illustrated in Fig. 4 while in Fig. 6 a means of assembling columns by the use of the registering or locating marks 1 only is shown. Where lines, columns, pages, etc., are assembled upon the auxiliary or assembling sheet for the purpose of transferring by contact transfer, the marks or lines 7 of the auxiliary sheet would be printed in non-transferring ink so as not to appear upon the printing surface.

It will be understood that where an assembling sheet is used or where one design or character-bearing surface is superposed upon another that the various design or character-bearing surfaces may be attached to each other or to the assembling sheet in any suitable or convenient manner. It will frequently be found convenient to use for this purpose an aqueous adhesive, such as gum arabic, although other adhesives may be used as well as other means of holding various design or character-bearing surfaces to position.

From all the foregoing it will be obvious that method and means are herein disclosed whereby composed lines, "takes," articles, etc., may be accurately and expeditiously assembled into columns, columns into pages and pages into forms, so that a unitary printing surface comprising the entire matter in proper relation may be secured when so desired.

The invention, in its broader aspects is not limited to the particular means and apparatus for carrying the method into effect shown and described, nor to any particular means or apparatus for the said purpose, nor is it limited to the particular embodiment of the design-bearing or character-bearing surface, nor to any particular embodiment thereof, nor is it limited to the particular embodiment of the auxiliary or assembling sheet, nor to any particular embodiment thereof, as many changes may be made in any or all of these without departing from the main principles of the invention and without sacrificing its chief advantages.

It will be understood that the terms "strip" or "sheet" as used in the description and claims herein are not limited to a body of any particular material, nature or shape, but includes any body which may be found suitable as a design-bearing or character-bearing surface.

What I claim as my invention, and desire to secure by Letters Patent, is:

1. The method of registering or positioning with respect to each other a plurality of surfaces, each bearing one or more lines of letter-press matter, in page or column form for the purpose of reproducing in a printing plate, which comprises placing upon a plurality of surfaces lines of letter-press matter arranged in page or column alinement and placing registering marks at the end of each line of letter-press matter so that the marks for successive lines will be continuous longitudinally along the page or column, removing a line strip from one of said surfaces and substituting said line strip, in column or page alinement upon another surface carrying a plurality of lines by means of said marks at the edges of the line strip and the marks at the ends of the lines upon said other surface.

2. The method of registering or positioning with respect to each other a plurality of surfaces, each bearing one or more lines of letter-press matter, in page or column form for the purpose of reproducing in a printing plate, which comprises placing lines of letter-press matter upon a surface in column of page alinement, placing registering marks at the ends of the lines in definite relation to the lines to furnish a guide for column or page alinement and other registering marks to furnish a guide for interlinear spacing, placing a line of characters upon another surface, placing a registering mark at the end of the line having the same relations to its line as the marks on the other surface to their lines, and then positioning the letter-press matter on the two surfaces with reference to each other both as to column alinement and interlinear spacing by alining the marks on the two surfaces with each other.

3. The method of registering or positioning with respect to each other a plurality of surfaces, each bearing one or more lines of letter-press matter, in page or column form for the purpose of reproducing in a printing plate, which comprises placing upon said surfaces registering marks or lines in definite relation to each line and to the distance between lines and then bringing the lines of characters upon a plurality of said surfaces into proper position relatively to each other both as regards column or page alinement and interlinear spacing by alining the registering marks on the surfaces.

4. The method of registering or positioning with respect to each other surfaces, each bearing one or more lines of letter-press matter in page or column form for the purpose of reproducing in a printing plate, which comprises placing upon said surfaces registering marks or lines in definite relation to the end of each line and to the distance between lines and then bringing the lines of characters upon a plurality of said surfaces into proper position as regards both column or page alinement and interlinear spacing by alining the registering marks on the surfaces.

5. The method of registering or positioning with respect to each other surfaces, each bearing one or more lines of letter-press matter in page or column form for the purpose of reproducing in a printing plate, which comprises placing upon said surfaces registering marks or lines in definite relation to each end of each line and to the distance between lines and then bringing the lines of characters upon a plurality of said surfaces into proper position as regards both column or page alinement and interlinear spacing by alining the registering marks on the surfaces.

6. The method of registering design or character-bearing surfaces preparatory to transferring to a printing plate which comprises imposing upon a strip or sheet a design or character and also imposing upon said strip or sheet a mark or line in fixed or definite relation to said design or character and also imposing upon a second strip or sheet a design or character and a mark or line in the same fixed or definite relation to its design or character as the mark or line on the first strip or sheet bears to its design or character and then bringing the design or character upon the first-named strip or sheet and the design or character upon the other strip or sheet into fixed or definite relation by means of the marks or lines upon the respective strips or sheets.

7. The method of registering design or character-bearing surfaces preparatory to transferring to a printing plate which comprises imposing upon a strip or sheet a design or character and also imposing upon said strip or sheet a mark or line in fixed or definite relation to said design or character and also in fixed or definite relation to the edge or edges of the strip or sheet and then imposing a design or character upon another strip or sheet and also imposing upon such other strip or sheet a mark or line in the same fixed or definite relation to the design or character as the mark or line upon the first strip or sheet bears to its design or character, and also in fixed or definite relation to the edge or edges of its strip or sheet, and then bringing the design or character upon the first-mentioned strip or sheet and the design or character upon the other strip or sheet into fixed or definite relation by means of the marks or lines upon the respective strips or sheets.

8. The method of registering design or character-bearing surfaces preparatory to transferring to a printing plate which comprises imposing upon a strip or sheet a design or character and also imposing upon said strip or sheet a mark or line in fixed or definite relation to said design or character and also imposing upon a second strip or sheet a design or character and a mark or line in the same fixed or definite relation to its design or character as the mark or line on the first strip or sheet bears to its design or character and then bringing the said designs or characters into fixed or definite relation with respect to each other by causing the marks or lines upon the said respective strips or sheets to be brought into definite relation with similar marks or lines upon an assembling sheet.

9. The method of registering design or character-bearing surfaces preparatory to transferring to a printing plate which comprises imposing upon a strip or sheet a design or character and also imposing upon said strip or sheet a mark or line in fixed or definite relation to said design or character and also in fixed or definite relation to the edge or edges of the strip or sheet, and also imposing upon a second strip or sheet a design or character and a mark or line in the same fixed or definite relation to its design or character and to the edge or edges of its strip or sheet, as the mark or line on the first strip or sheet bears to its design or character and then bringing the said designs or characters into fixed or definite relation with respect to each other by causing the marks or lines upon the said respective strips or sheets to be brought into definite relation with similar marks or lines upon an assembling sheet.

10. The method of registering design or character-bearing surfaces preparatory to transferring to a printing plate which comprises imposing upon a strip or sheet a design or character and also imposing upon said strip or sheet a mark or line in fixed or definite relation to said design or character and also imposing upon a second strip or sheet a design or character and a mark or line in the same fixed or definite relation to its design or character as the mark or line on the first strip or sheet bears to its design or character and then imposing upon a third strip or sheet marks or lines having a fixed or definite relation such that when each of the design-bearing or character-bearing strips or sheets are brought into fixed or definite relation with said third strip or sheet they are also brought into fixed or definite relation with respect to each other.

11. The method of registering design or character-bearing surfaces preparatory to transferring to a printing plate which comprises imposing upon a strip or sheet a plurality of series of designs or characters and also imposing upon said strip or sheet a plurality of marks or lines, each mark or line having a fixed or definite relation to a particular series of designs or characters and also imposing upon a second strip or sheet a plurality of series of designs or characters and a plurality of marks or lines, each of said last-named marks or lines being in the same fixed relation to its series as one of the marks or lines upon the first design-bearing or character-bearing strip or sheet bears to its series, and then imposing upon a third strip or sheet marks or lines bearing to each other a similar relation as the marks or lines of the respective series upon the respective design-bearing or character-bearing strips or sheets bear to their series, and then bringing the series of designs or characters upon each design-bearing or character-bearing strip or sheet into definite relation with the marks upon the said third strip or sheet by means of the marks or lines upon the design-bearing or character-bearing strip or sheet and thereby establishing a fixed or definite relation between the series of designs or characters upon the respective design-bearing or character-bearing strips or sheets.

12. The method of registering character bearing surfaces preparatory to making a printing plate, which comprises placing upon a suitable surface a line of characters having a registering mark in definite relation therewith to indicate page or column alinement and interlinear spacing, placing a similar line and mark upon another surface and bringing said lines into proper position in the page or column by means of their respective marks.

13. The method of registering character bearing surfaces and making a printing plate therefrom, which comprises placing upon a suitable surface a line of characters having a registering mark in definite relation therewith to indicate page or column alinement and interlinear spacing, placing a similar line and mark upon another surface and bringing said lines into proper position in the page or column by means of their respective marks and making a printing plate from said surfaces when so positioned.

14. The method of registering or positioning with respect to each other a plurality of surfaces, each bearing one or more lines of letter-press matter, in page or column form for the purpose of reproducing in a printing plate and making a printing plate therefrom, which comprises placing upon said surfaces registering marks or lines in definite relation to each line and to the distance between lines and then bringing the lines of characters upon a plurality of said surfaces into proper position relatively to each other both as regards column or page alinement and interlinear spacing by alining the registering marks on the surfaces, and making a printing plate from said surfaces when so positioned.

In testimony whereof I have signed my name to this specification in the presence of two subscribing witnesses.

AUGUSTE L. SALTZMAN.

Witnesses:
    John D. Morgan,
    Clara Phillips.